United States Patent [19]

Wertheim

[11] Patent Number: 5,194,757

[45] Date of Patent: Mar. 16, 1993

[54] UNINTERRUPTIBLE POWER SUPPLY

[75] Inventor: Max M. Wertheim, Huntington, N.Y.

[73] Assignee: Grumman Aerospace Corporation, Bethpage, N.Y.

[21] Appl. No.: 616,269

[22] Filed: Nov. 20, 1990

[51] Int. Cl.$^5$ .............................. H02J 3/38; H02J 9/06
[52] U.S. Cl. ........................................ 307/87; 307/67; 307/84; 322/47
[58] Field of Search ...................... 307/43, 47, 67, 68, 307/84, 87; 322/47, 61

[56] References Cited

U.S. PATENT DOCUMENTS

| | | | |
|---|---|---|---|
| 3,832,625 | 8/1974 | Gyugyi | 322/47 X |
| 4,382,188 | 5/1983 | Cronin | 290/1 C |
| 4,401,938 | 8/1983 | Cronin | 322/47 X |
| 4,525,633 | 6/1985 | Wertheim et al. | 290/44 |
| 4,645,940 | 2/1987 | Wertheim | 307/66 |
| 5,077,485 | 12/1991 | Rashid | 307/84 |

FOREIGN PATENT DOCUMENTS 1-164300A  6/1989  Japan ............................. 322/47

Primary Examiner—A. D. Pellinen
Assistant Examiner—Fritz M. Fleming
Attorney, Agent, or Firm—Richard G. Geib; Daniel J. Tick

[57] ABSTRACT

Each of at least two asynchronous generators connected to a common electrical load for uninterruptibility of the power supply is driven by a corresponding one of at least two drives in such a way that when any one of the generators is driven above synchronous speed by a slip fraction while its stator is electrically excited, its shaft mechanical power is converted to electrical output power at its output terminal. A control circuit is connected to the load, coupled to the output terminals of the generators and connected to the input terminals of the generators and provides an excitation voltage and controls the phase of the excitation voltage of each of the generators with respect to the load voltage. This controls the slip fraction of each of the generators loosely whereby load current from any source is completely controlled.

10 Claims, 5 Drawing Sheets

UNINTERRUPTIBLE POWER SUPPLY

BACKGROUND OF THE INVENTION

The present invention relates to an uninterruptible power supply. More particularly, the invention relates to a system in which several power sources are coupled to a common load to achieve uninterruptibility of the power supply.

U.S. Pat. No. 4,645,940 issued to the present inventor for Interrupt-Free, Unregulated Power Supply on Feb. 24, 1987. In this United States patent, FIG. 1 shows several salient pole alternators coupled to a common load via chokes. The present invention eliminates those chokes and simplifies the control scheme by utilizing the inherent controllable inductive reactive and output power as a function of slip characteristics of cast squirrel cage rotor asynchronous (induction) generators together with appropriate drive, excitation and control means.

Induction machine theory states that electrical input power will be converted to mechanical (shaft) output power when such a machine operates below synchronous speed by a specified slip fraction "s". The larger the load demand, within machine ratings, the larger "s" becomes. The machine is thus a "motor". The same theory avers that, if the shaft is driven above synchronous speed by a similar slip fraction "−s" while the stator is electrically excited, shaft input mechanical power will be converted to electrical output power at the stator terminals. The voltage and frequency of this power will be determined by the parameters of the excitation source alone. The heavier the load demand, the higher the absolute value of "−s" must be. The machine then functions as an asynchronous generator.

The connection of two or more such sources in parallel in the manner shown in FIGS. 1 and 2 herein, with appropriate control means, will result in an interrupt-free AC power supply. This type of system will perform as well as that described in U.S. Pat. No. 4,465,940 and will, in addition, provide better static frequency and voltage regulation and will have the capability to handle constant power loads.

Control of slip alone results in a 25 to 30% variation in output voltage phase angle over the load range of a standard design of machine. This is more than enough to achieve the necessary degree of uninterruptibility. Typically, voltage excursions of less than 10% of nominal, phase excursions of less than 10° and recovery within less than ¼ cycle are required. Control of the phase between the excitation voltage $V_{exc}$ and the load voltage $V_L$ further reduces the excursions and speeds recovery from transient disturbances.

A relatively broad range of load power factors may be accommodated as well, with no loss of control or stability. This statement is particularly important, for, given that system performance is primarily dependent on generator characteristics and the control thereof, both constant power and constant impedance loads are equally well served. This differs from the system of U.S. Pat. No. 4,645,940. In the system of the present invention, load current dynamics are easily accommodated without major load voltage disturbance by the very nature of the control technique, since a change in demand results in a change in slip "−s", which then causes a change in the rotor equivalent reactance (referred to the stator) $-sX_R$ of the asynchronous generator. In the power supply of U.S. Pat. No. 4,645,940, there is no change in coupling inductance, slowing the maximum current change rate, slowing system response, and creating a load voltage and phase transient of some magnitude depending on the design. The same reasoning clearly shows that the power supply of the present invention is much more capable of rapidly handling the switching of large blocks of load power on and off.

Improved static regulation occurs in the power supply of the invention, because generator terminal voltage depends only on excitation voltage levels, not on load current or power factor, or, for that matter, any other external cause/phenomenon.

Finally, this concept produces the lightest, most efficient interrupt-free power supply for any particular application, due to the facts that (a) asynchronous machines are lighter, smaller and more efficient than synchronous machines, (b) external chokes are not required and (c) the excitation and control power is lower for the system of the invention than an equivalent one using synchronous generators. Furthermore, since the system of the invention is simple and has few parts, reliability and maintainability are enhanced.

The principal object of the invention is to provide an uninterruptible power supply of simple structure wherein the power fraction of each of at least two sources may be set independently of the total load involved, so that failure of any source permits the load to be fed uninterruptedly.

An object of the invention is to provide an uninterruptible power supply having at least two sources, the power fraction of each of which may be set independently of the total load involved, so that failure of any source permits the load to be fed uninterruptedly and the fraction from each remaining source is adjusted to account for the number of failed sources.

Another object of the invention is to provide an uninterruptible power supply wherein failed ones of at least two sources are disconnected following failure in order to prevent a stationary machine from becoming a faulted or parasitic load on the power system.

Still another object of the invention is to provide an uninterruptible power supply suitable for use in aircraft, submersibles and aerospace vehicles, where space and weight are closely limited and regulation is necessary or desirable.

Yet another object of the invention is to provide an uninterruptible power supply which utilizes a multiplicity of rotary powered electrical sources and static backup emergency battery-energized inverter sources.

Another object of the invention is to provide an uninterruptible power supply in which either one source at a time will carry the full load, or in which several sources will share the required load power in accordance with a predetermined scheme.

Still another object of the invention is to provide an uninterruptible power supply of great reliability, minimum weight and minimum volume and which is inexpensive in maintenance.

Yet another object of the invention is to provide an uninterruptible power supply which eliminates coupling chokes and utilizes the controllable inductive reactance characteristics of asynchronous generators together with drive, excitation and control means.

Another object of the invention is to provide an uninterruptible power supply which serves both constant power and constant impedance loads equally well.

Still another object of the invention is to provide an uninterruptible power supply in which load current dynamics are easily accommodated without major load voltage or frequency disturbance, since a change in demand is accompanied by a change in the equivalent rotor reactance of the asynchronous generator.

Yet another object of the invention is to provide an uninterruptible power supply which is capable of readily responding to the switching of large blocks of load power on and off.

Another object of the invention is to provide an uninterruptible power supply having improved static regulation, due to the dependence of generator terminal voltage only on excitation voltage levels, not on load current, power factor, or any other external cause or phenomenon.

Still another object of the invention is to provide an uninterruptible power supply which is more efficient, more effective, lighter in weight, smaller in volume and lower in excitation and control power than the power supply of U.S. Pat. No. 4,645,940 and is of simple structure, great reliability and easy maintainability.

BRIEF SUMMARY OF THE INVENTION

In accordance with the invention, an uninterruptible power supply comprises n asynchronous generators, each having a shaft connected to a controllable drive means, and an input terminal, a stator, and an output terminal connected to a common electrical load, wherein n is a whole integer equal to at least two. Each of n drive means drives a corresponding one of the generators, whereby when any one of the generators is driven above synchronous speed by a slip fraction "−s" while its stator is electrically excited, its shaft mechanical power is converted to electrical output power at its output terminal. Control means coupled to the load and connected to the input terminals of the generators provides an excitation voltage to each of the generators and controls the phase of the excitation voltage of each of the generators with respect to the load voltage the excitation voltage controlling the slip fraction of each of the generators whereby load current from any of the generators is completely controlled.

The control means includes electronic control means having a first input terminal connected to the load, n inputs each coupled to the output terminal of a corresponding one of the generators for sensing the output current of each of the generators and a first plurality of n output terminals, n VAR corrector/phase shifting means each having an output terminal connected to the input terminal of a corresponding one of the generators, a first input terminal connected to a corresponding one of the first plurality of output terminals of the electronic control means and a second input terminal and excitation inverter means providing an excitation voltage for each of the generators, the excitation inverter means being connected to the second input terminal of each of the VAR corrector/phase shifting means for controlling the relative phase of the excitation voltage of each of the generators, the output power of each of the generators having a voltage and frequency determined by parameters of the excitation inverter means. "VAR" is intended to mean "volt-ampere reactive" herein.

The excitation energy is supplied to the generator by the excitation inverter through the VAR corrector/phase shifter. The VAR corrector/phase shifter functions to force excitation voltage to lead generator terminal (output) voltage by a phase angle inversely proportional to generator load and generator load power factor. This is required by machine theory. This invention adds the constraint that the specified load fraction for a generator and/or a failure which causes the load fraction to change also controls excitation voltage phase angle consistent with machine theory.

The electronic control means controls the behavior of the VAR correctors/phase shifters in accordance with the aforementioned machine theory. In the embodiment of FIG. 1, the electronic control means also controls the slip fraction "−s" by controlling the electromagnetic clutch, hereinafter referred to.

Each of n magnetic sensors is provided at the output terminal of a corresponding one of the generators for sensing current.

Each of the drive means may comprise an engine having an output shaft, gear means coupled to the output shaft of the engine and electromagnetic clutch means coupling the gear means to a corresponding one of the generators. This embodiment is shown in FIG. 1.

The electronic control means further has a second plurality of n output terminals, each connected to the clutch means of a corresponding one of the generators for controlling the slip fraction of the corresponding one of the generators.

Each of the drive means may comprise an engine and an inversely drooped hydraulic drive coupling the engine to a corresponding one of the generators. This embodiment is shown in FIG. 2.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENT

Figure 1:
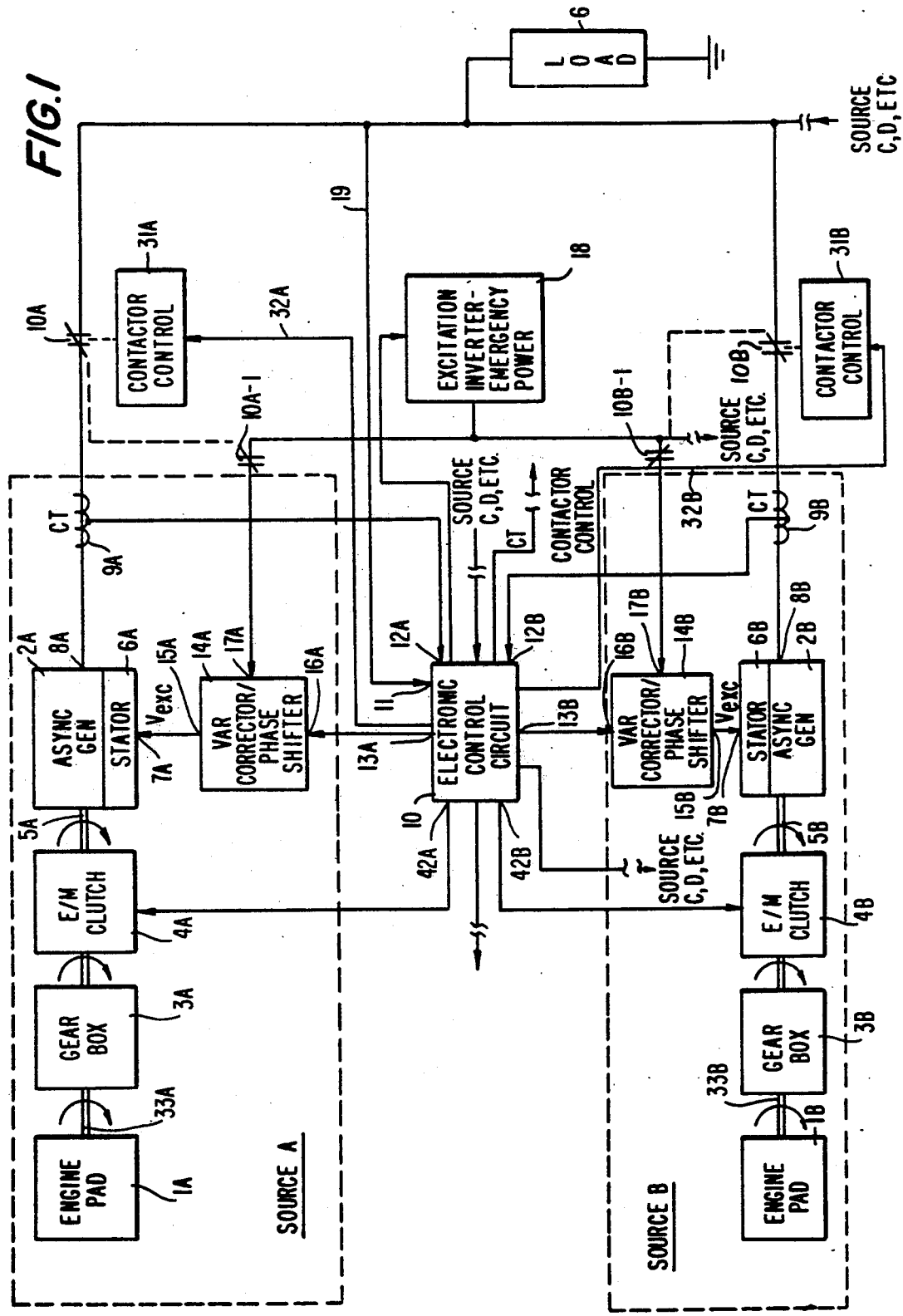
FIG. 1 is a schematic block diagram of a first embodiment of the uninterruptible power supply of the invention.
Figure 2:
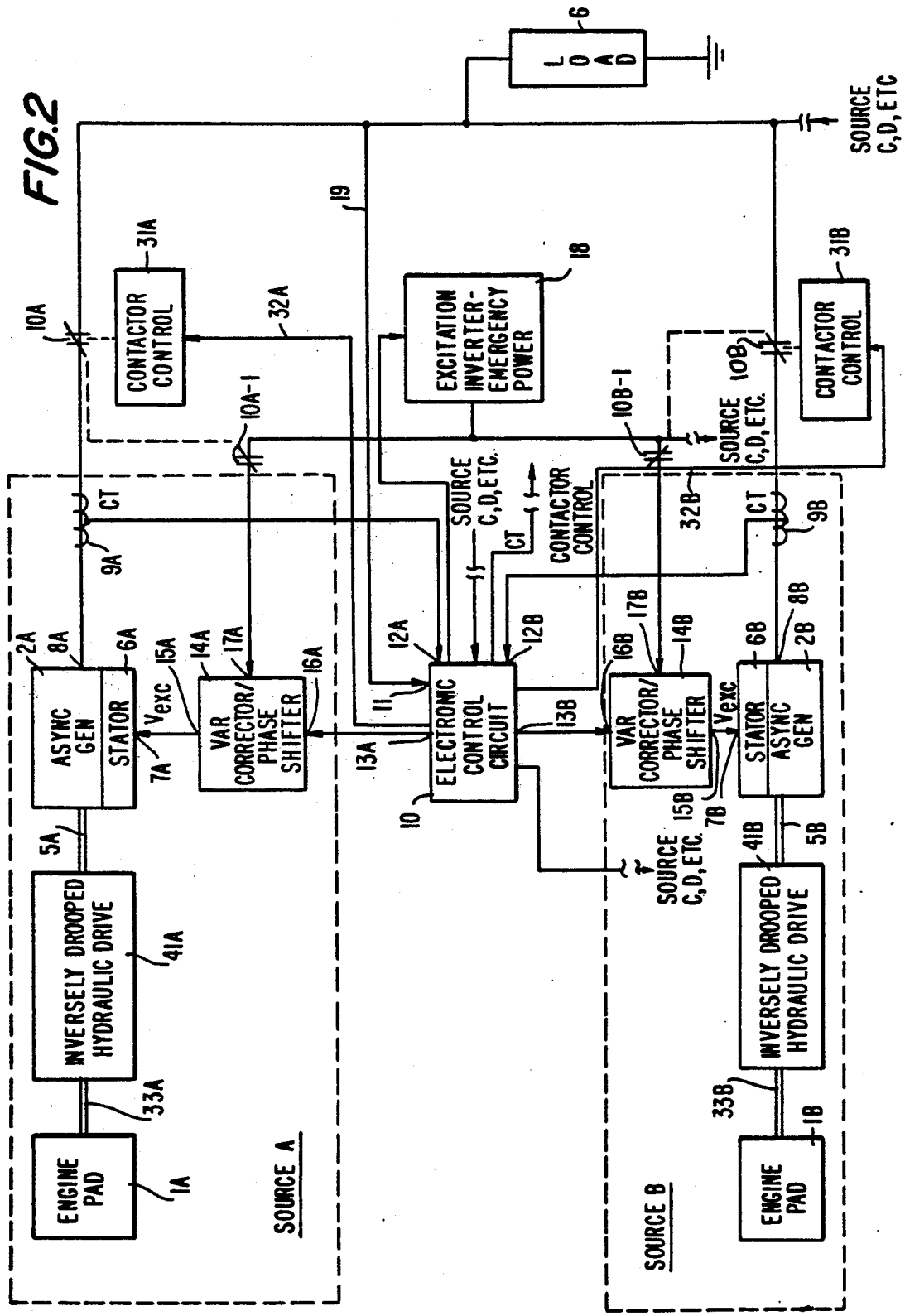
FIG. 2 is a schematic block diagram of a second embodiment of the uninterruptible power supply of the invention.

The first embodiment of the invention, as shown in FIG. 1, utilizes direct mechanical gear boxes from an engine pad 1A, 1B, and so on, of any suitable known type, to drive an asynchronous generator 2A, 2B, and so on, of any suitable known type, through a gear box 3A, 3B, and so on, of any suitable known type, and an electromagnetic clutch 4A, 4B, and so on, of any suitable known type.

n asynchronous generators 2A, 2B, and so on, are provided, each having a shaft 5A, 5B, and so on, connected to the output of the E/M clutch 4A, 4B, and so on (FIG. 1), an input terminal, a stator, and an output terminal connected to a common electrical load 6 (FIGS. 1, 2 and 3). n is a whole integer equal to at least two. Thus, as shown in FIGS. 1 and 2, the generator 2A has an input terminal 7A, a stator (6a and 6b), a shaft 5A and an output terminal 8A connected to the load 6 through the primary of a magnetic sensor or current transformer 9A and a contactor 10A. The generator 2B has an input terminal 7B, a stator (6a and 6b), a shaft 5B and an output terminal 8B connected to the load 6 through the primary of a magnetic sensor or current transformer 9B and contactor 10B. The input and output terminals may be, and probably are, the same physical termination devices. Both are connected to the same stator winding, because normally an induction machine has only one such winding. Although single-phase machines are shown in the drawings for simplicity, an actual system will most likely use three-phase, four-wire machines.

The engine pad 1A, the gear box 3A and the electromagnetic clutch 4A constitute the drive means for driving the asynchronous generator 2A, whereby when said generator is driven above synchronous speed by a slip fraction "−s" while its stator is electrically excited its shaft 5A mechanical power is converted to electrical output power at its output terminal 8A. This is true for each of the other power sources B, C, D, etc., as well.

A control circuit adjusts power flow from each source by exerting control over both the clutch 4A, thus affecting the slip fraction "−s" and the relative phase of the excitation voltage $V_{exc}$ as hereinbefore stated, the clutch control loop is relatively low-gain, and, thus both stable and fast-acting.

The control circuit is connected to the load 6, coupled to the output terminals 8A, 8B, and so on, of the generators 2A, 2B, and so on, and connected to the input terminals 7A, 7B, and so on, of said generators for providing the excitation voltage $V_{exc}$ to each of said generators with respect to the load voltage $V_L$ (FIGS. 1 and 2). This controls the slip fraction "−s" of each of the asynchronous generators 2A, 2B, and so on, whereby load current from any source is completely controlled. The control of $V_{exc}$ phase shift and the electromagnetic clutch are from separate outputs in the electronic control circuits box. Each channel in that box will be something like the circuit of FIG. 3. The FIG. 2 embodiment does not require the electromagnetic clutch scaling amplifier, but there is another scheme using a controlled hydraulic drive, which would need a valve coil amplifier instead of the electromagnetic clutch device. Both the phase shift control and the clutch control are derived from the same error signal, and both act in concert.

The control circuit includes an electronic control circuit 10 (FIGS. 1 and 2) having a first input terminal 11 connected to the load 6 and n inputs 12A, 12B, and so on, each coupled to the magnetic sensor or current transformer secondary 9A, 9B, and so on, of a corresponding one of the generators 2A, 2B, and so on, as shown in FIGS. 1 and 2, for sensing current. The electronic control circuit also has a first plurality of n output terminals 13A, 13B, and so on.

The control circuit further includes n VAR correctors/phase shifters 14A, 14B, and so on, of any suitable known type, as shown in FIGS. 1 and 2. Suitable known VAR correctors/phase shifters may comprise controllable capacitor banks. The VAR correctors and phase shifters 14A, 14B, and so on, each have an output terminal 15A, 15B, and so on, connected to the input terminal 7A, 7B, and so on, of the corresponding one of the generators 2A, 2B, and so on, as shown in FIGS. 1 and 2, and a first input terminal 16A, 16B, and so on, connected to a corresponding one of the first plurality of output terminals 13A, 13B, and so on, of the electronic control circuit 10 (FIGS. 1 and 2). The VAR correctors/phase shifters 14A, 14B, and so on, each also have a second input terminal 17A, 17B, and so on.

The system also includes an excitation inverter 18 which provides an excitation voltage for each of the generators 2A, 2B, and so on, via the VAR correctors/phase shifters. The excitation inverter 18, which may comprise any suitable known static inverter, is connected to the second input terminal 17A, 17B, and so on, of each of the VAR correctors/phase shifters 14A, 14B, and so on, for controlling the relative phase of the excitation voltage $V_{exc}$ of each of the generators 2A, 2B, and so on, (FIGS. 1 and 2). The output power of each of the asynchronous generators 2A, 2B, and so on, has a voltage and frequency determined by parameters of the excitation inverter 18, such parameters being $V_{exc}$ and $f_{exc}$.

In the embodiments of FIGS. 1 and 2, the single static inverter 18 excitation source is used to permit permanent parallel connection of all operating sources. The inverter 18 provides crystal control of its output frequency to assure stable system frequency control operation. For realiability, redundant inverters with master-slave or first-up operating schemes may be used. Rating of the inverter is based on the no-load requirements of the generators 2A, 2B, and so on; about 4% of the total rating of all generators. The VAR correctors/phase shifters 14A, 14B, and so on, are designed to keep the inverter 18 as small as possible. These supply the extremely low power factor leading VA needed by an asynchronous generator feeding a lagging power factor load.

The inverter 18, powered by an emergency battery, which is kept charged when the system runs normally, is also used to supply emergency backup power when all other sources fail. This fact also affects inverter rating. The inverter is coupled to the load through a choke in accordance with U.S. Pat. No. 4,645,940 (not shown in the FIGS.).

The n magnetic sensors or current transformers 9A, 9B, and so on, are provided, each at the output terminal 8A, 8B, and so on, of a corresponding one of the generators 2A, 2B, and so on, as shown in FIGS. 1 and 2, for sensing current. The sensors 9A, 9B, and so on, may be of any suitable known type and are magnetic in order to minimize parasitic losses and other undesirable effects.

The power flow conditions are preprogrammed for the application and actual values are detected by current sensors, backed by voltage sensors at the load 6.

Figure 3:
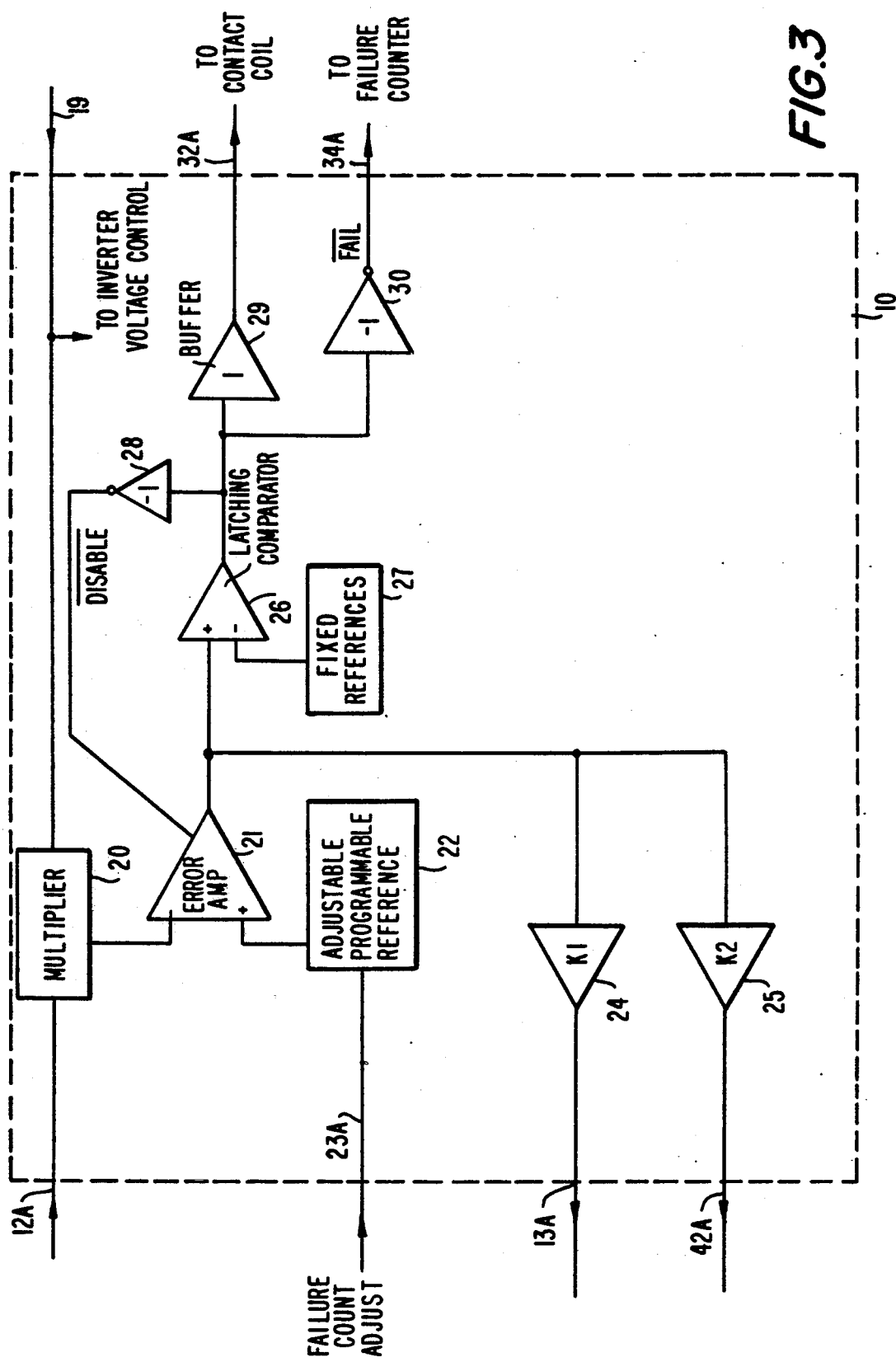
FIG. 3 is a block diagram of an embodiment of a channel of a generator control electronic circuit of the uninterruptible power supply of the invention.
Figure 4:
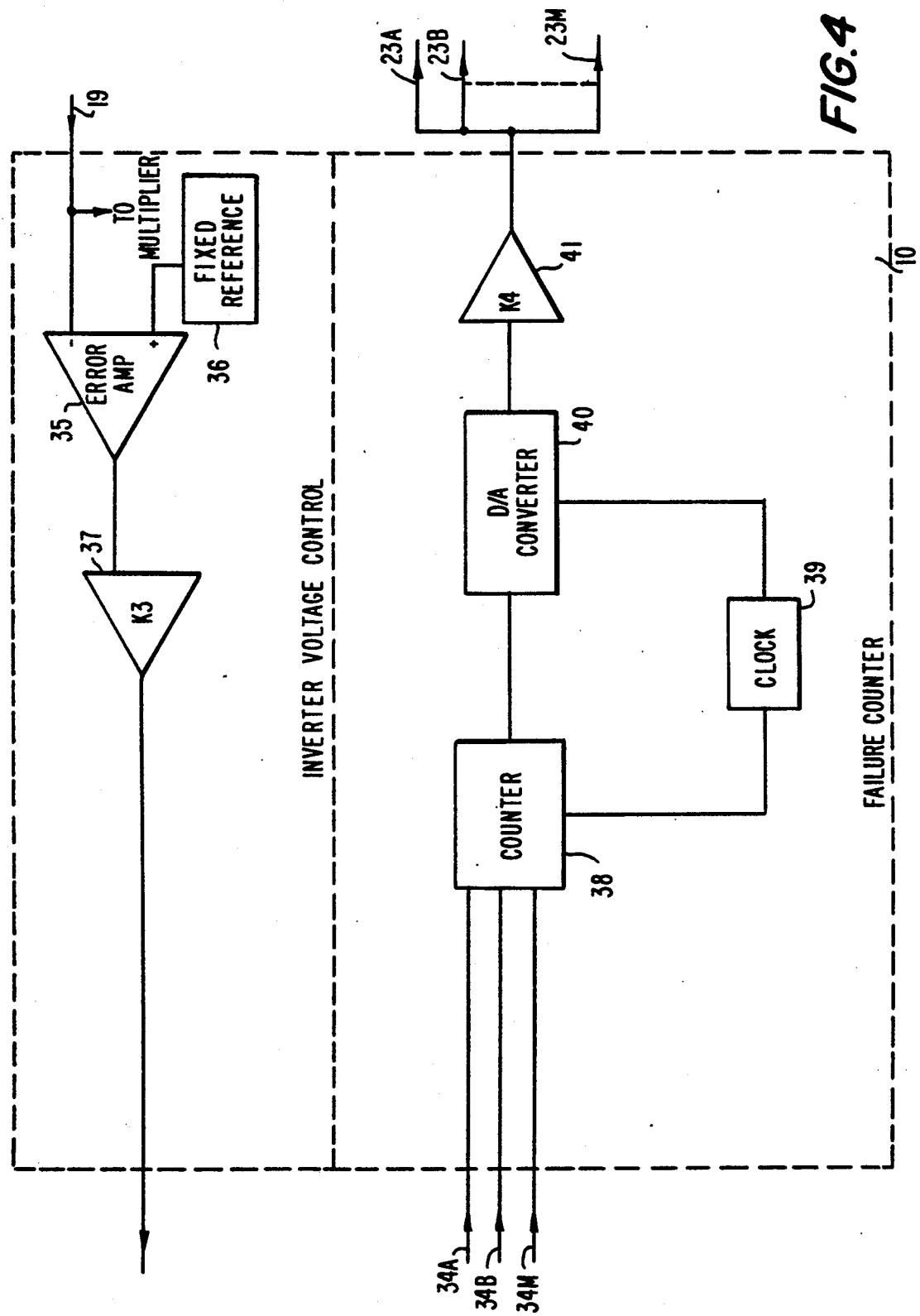
FIG. 4 is a block diagram of an embodiment of the inverter voltage control and failure counter electronic control circuits of the uninterruptible power supply of the invention.

The electronic control circuit 10 comprises the circuits and functions shown in FIGS. 3 and 4. There are n channels of generator control, as shown in FIG. 3. The generator output current, as measured by the magnetic sensor (current transformer) 9A, 9B, etc., and transmitted on signal wire 12A, 12B, etc., is multiplied appropriately with the load voltage shown on signal wire 19 in a multiplier 20. The output signal of the multiplier 20 is thus a measure of the contribution to total load VA (volt-amperes) of each of generators 2A, 2B, etc. Any departure of the VA from a generator from the preprogrammed amount is amplified by an error amplifier 21. The error amplifier 21, in turn, is programmed by the adjustable programmable reference 22. The reference 22 is controlled by initially setting the prescribed fraction of total load VA desired in accordance with individual system design, and then adjusting that fraction in a prescribed manner by means of the failure count adjust signal on signal wire 23A, 23B, etc., derived from the failure counter shown in FIG. 4.

The output of the error amplifier 21 is fed to three devices: a scaling amplifier 24 or K1, a scaling amplifier 25 or K2, and a latching comparator 26. The scaling amplifier 24 scales the output of error amplifier 21 appropriately to control the VAR corrector/phase shifter 14A, 14B, etc., via signal wire 13A, 13B, etc. The VAR corrector/phase shifter 14A, 14B, etc., in turn, provides proper excitation to each asynchronous generator 2A, 2B, etc., for the load and failure conditions then prevailing. The scaling amplifier 25 scales the output of the error amplifier 21 similarly to control the electromagnetic clutch 4A, 4B, etc., coupling and thus the generator 2A, 2B, etc., shaft speed (that is, the slip fraction "−s") for the same load and failure conditions. The latching comparator 26 is activated only when its associated generator fails. Under this condition, the sensed current goes to zero, as hereinbefore described, and the signal on signal wires 12A, 12B, etc., as appropriate, drops to zero or reverses sense, depending on design, causing the multiplier 20 output to go to zero, as well as feedback input to error amplifier 21. This causes the output of the error amplifier to saturate near the value of its positive supply rail, a level higher than the output of a fixed reference 27. In turn, this causes the output of the latching comparator 26 to go to a logic high (one).

The latching comparator 26 feeds three devices: a logic inverter 28, a buffer 29 and a logic inverter 30. With the input to the logic inverter 28 high, the output goes low, disabling the error amplifier 21 from further operation until reset. Control is thus removed from both the VAR corrector/phase shifter 14A, 14B, etc., as appropriate, and the electromagnetic clutch 4A, 4B, etc., as appropriate. The buffer 29, in turn, drives a contactor controller 31A, 31B, etc., as appropriate, via signal wire 32A, 32B, etc., as appropriate, to disconnect the generator 2A, 2B, etc., as appropriate, from the load, and excitation power from the VAR corrector/phase shifter 14A, 14B, etc., as appropriate, as hereinbefore described. Thus, all excitation and mechanical power drive to the failed generator are reduced to zero, and the failed unit cannot spuriously load the system. Any failure of the main power train (engine pad 1A, 1B, etc.; shaft 33A, 33B, etc.; gear box 3A, 3B, etc.; electromagnetic clutch 4A, 4B, etc.; generator shaft 5A, 5B, etc.; asynchronous generator 2A, 2B, etc.) in any channel will cause its generator control circuit to so behave. Logic inverter 30 issues a "this channel has failed" signal via signal wires 34A, 34B, etc., as appropriate, to the failure counter of FIG. 4, whose further action is described hereinafter.

The balance of the electronic control circuit 10 comprises an inverter voltage control and failure counter, shown in FIG. 4. The inverter voltage control comprises an error amplifier 35, a fixed reference 36 and a scaling amplifier 37 or K3. The error amplifier 35 amplifies the difference between the load voltage sensed via the signal wire 19 and the fixed reference 36. This amplified difference then is scaled by the scaling amplifier 37 to control the inverter voltage, and thus the excitation voltages of the generators 2A, 2B, etc., via VAR corrector/phase shifter 14A, 14B, etc. As is well known, control of the excitation voltage will effect control of the load voltage. The sensed load voltage on the signal wire 19 is also fed to the multiplier 20, as hereinbefore described.

The failure counter comprises a counter 38, a clock 39, a digital-to-analog (D/A) converter 40 and a scaling amplifier 41 or K4. The counter receives failure signals via signal wires 34A, 34B, etc., from the logic inverter 30 (FIG. 3) of each channel, as hereinbefore described. For any "fail" signal (logic zero) on any one of the lines, the counter advances one count at its output the first time only such a signal appears, and when enabled by the clock 39. This count is translated to an analog voltage level by the D/A converter 40, which also uses the clock 39 output in a manner well known to those skilled in the art. This analog voltage is scaled appropriately to reprogram the adjustable programmable references 22 (FIG. 3) in all channels to effect redistribution of load fraction VA from each remaining operating generator 2A, 2B, etc., as hereinbefore described. The reprogramming signals are passed to adjustable programmable references 22 via signal wires 23A, 23B, etc.

The load voltage, when sensed via signal wire 19, will be transformed or otherwise divided down and rectified to a lower DC level. This will be implemented in any design following the principles of this invention without departure from the spirit or letter thereof. Many of the electronic control functions in this embodiment use microprocessors, various types of memory and embedded software, and/or other appropriate means from digital computing and/or modern analog technology without departing from the invention. The embodiment of FIG. 2 can be modified to cause control of the hydraulic drive 41A, 41B, etc., droop to be effected by an electromagnetically driven flow valve without departing from the invention. Other similar variations will occur to those skilled in the art, and will be based on specific design requirements, but still retain the principles of the invention.

The excitation voltage phase control loop is the primary one of the power supply. In the first embodiment of FIG. 1, the drive means comprises the gear box 3A, 3B, and so on, coupled to the output shaft 33A, 33B, and so on, of the engine pad or motor 1A, 1B, and so on, and the electromagnetic clutch 4A, 4B, and so on, coupling the gear box to the corresponding one of the generators 2A, 2B, and so on, as shown in FIG. 1, and as hereinbefore stated. The electronic control circuit 10 utilized in the first embodiment further has a second plurality of n output terminals 42A, 42B, and so on, each connected to the clutch 4A, 4B, and so on, of a corresponding one of the generators 2A, 2B, and so on (FIG. 1), for helping to control the slip fraction "−s" of the corresponding one of said generators in conjunction with the excitation voltage phase control.

The clutch control in the first embodiment has just enough gain to keep the phase loop in its linear region and assure required load supply. The hydraulic drive of the second embodiment, shown in FIG. 2, is designed with the same rationale, so no external control is required. In the second embodiment of FIG. 2, the inversely or negatively drooped hydraulic drive 41A, 41B, and so on, couples the engine 1A, 1B, and so on, to a corresponding one of the generators 2A, 2B, and so on. The hydraulic drive is designed to have output speed, thus "−s", increase with increasing loading, and vice versa. This system is "negatively" or "inversely drooped". The hydraulic drive needs no external speed control.

As in the power supply of U.S. Pat. No. 4,645,940, the power supply of the present invention may be operated so that one source only, or any number of sources up to the total used, supplies the load. When more than one source is used, the power fraction of each can be set independently of the total load involved. Failure of any source then still permits the load to be fed uninterruptedly, and, in fact, the fraction from each remaining source can and should be adjusted to account for the number of failed sources. A failed source or failed sources should be disconnected following failure via contactors 10A, 10B, and so on, to ensure that a stationary machine does not constitute a faulted or parasitic load on the power system. The exciting power to a failed unit should also be disconnected via contactors 10A-1, 10B-1, and so on, for the same reason.

Rotary sources may be mated with static backup, battery energized inverter sources, provided the inverters are choke-coupled, as described in U.S. Pat. No. 4,645,940, and are frequency and phase controlled from the same excitation supply as the generators. By combining the control algorithms with an appropriate power management scheme, the entire power system can be made to be (n−1) Fail-Operational, n Fail-Safe, where n is the number of primary sources.

Figure 5:
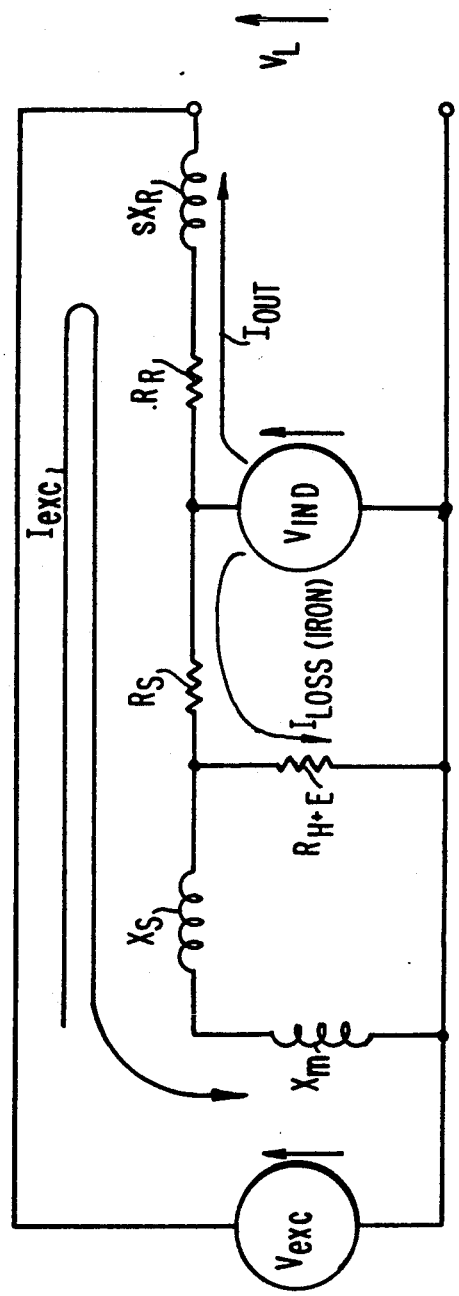
FIG. 5 is a circuit diagram of an approximate equivalent circuit of one phase of an asynchronous generator.

FIG. 5 shows an approximate equivalent circuit of one phase of an asynchronous generator. The loss parameters, which are essentially the magnetizing reactance $X_m$ and essentially the hysteresis/eddy current loss resistance $R_{H+E}$ are included for completeness. The values of induced current flow in the stator and loss paths due to $V_{ind}$ are small. The circuit of FIG. 5 is based on the well-known fact that the phase angle $\Phi$ between the load current $I_o$ and the induced voltage $V_{ind}$ is controlled only by the rotor parameters. Thus, $$\Phi = \cos^{-1} \frac{R_R}{(R_R^2 + s^2 X_R^2)^{\frac{1}{2}}}$$

It can be shown that the phase angle between the excitation voltage $V_{exc}$ and the induced voltage $V_{ind}$ is relatively large by comparison with $\Phi$ and that, by controlling the phase of $V_{exc}$ with respect to the load voltage $V_L$, and controlling the slip fraction "−s" loosely, load current from any such source can be completely controlled, just as it is in U.S. Pat. No. 4,645,940.

$X_S + X_m > > sX_R$, so that, even if $R_S \approx R_R$, current in the exciting reactance due to $V_{ind}$ is negligibly small.

Due to the foregoing and the opposing sense of $I_{exc}$ with respect to $I_{out}$, $I_{exc}$ leads $I_{out}$ and, thus $V_L$, by a substantial phase angle. For most real machines, this lead can be as much as 40 to 60 degrees electrical. VAR correctors must supply these leading power factor values. Exciting power factor is inversely proportional to load on the machine. That is, the smaller the load, the lower the power factor and the larger the leading exciting phase angle.

The exciting source supplies almost all the iron magnetizing current, whereas $V_{ind}$ supplies the copper and iron resistive losses. The conditions are: (1) $sX_R + X_S + X_m > > R_S + R_R$; (2) $X_m > > sX_R$; (3) $R_{h+e} > > R_S + R_R$; (4) $R_{h+e} > > X_m$. These facts also explain the high leading phase angle of $I_{exc}$ with respect to $V_L$.

An equivalent circuit model must show separate current loops for the iron and stator losses.

$V_{ind}$ is thus seen as a dependent voltage source, a function of $V_{exc}$ ($V_{ind} \sim k V_{exc}$). This is most true between no load and full load where $0 < s < 0.7 s_{max}$. In this region, k tends to be almost constant and $V_{ind}$ is a high, nearly fixed fraction of $V_{exc}$.

As a result of the foregoing, it is necessary to remove a failed, non-rotating machine from the line quickly, before either the power system or the exciting source is adversely affected. Both power and excitation connections would be severed (see contactors 10A/10A-1 to 10n/10n-1 in FIGS. 1 and 2).

Although shown and described in what are believed to be the most practical and preferred embodiments, it is apparent that departures from the specific power supplies described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

I claim:

1. An uninterruptible power supply comprising
   n asynchronous generators, each having an input terminal, a stator, a shaft and an output terminal connected to a common electrical load, wherein n is a whole integer equal to at least two and wherein a change in load demand results in a change in the slip fraction of each of said generators;
   n drive means, each driving a corresponding one of said generators, whereby when one of said generators is driven above synchronous speed by a slip fraction while its stator is electrically excited its shaft mechanical power is converted to electrical output power at its output terminal;
   contact means connected between said load and each of said generators; and
   control means coupled to said load, coupled to said contact means for disconnecting failed one or more of said generators from said load and connected to the input terminals of said generators for providing an excitation voltage to each of said generators and controlling the phase of the excitation voltage of each of said generators with respect to the load voltage, said excitation voltage controlling the slip fraction of each of said generators whereby load current from any of said generators is completely controlled, said control means including electronic control means having a first input terminal connected to said load, n inputs each coupled to the output terminal of a corresponding one of said generators for sensing the output current of each of said generators and a first plurality of n output terminals, n VAR correctors/phase shifting means each having an output terminal connected to the input terminal of a corresponding one of said generators, a first input terminal connected to a corresponding one of said first plurality of output terminals of said electronic control means and a second input terminal and excitation inverter means providing an excitation voltage for each of said generators, said excitation inverter means being connected to the second input terminal of each of said VAR correctors/phase shifting means for controlling the relative phase of the excitation voltage of each of said generators, the output power of each of said generators having a voltage and frequency determined by parameters of said excitation inverter means.

2. An uninterruptible power supply as claimed in claim 1, wherein said control means further includes n magnetic sensors each at the output terminal of a corresponding one of said generators for sensing current.

3. An uninterruptible power supply as claimed in claim 1, wherein each of said drive means comprises an engine and an inversely drooped hydraulic drive coupling the engine to a corresponding one of said generators.

4. An uninterruptible power supply as claimed in claim 1, wherein each of said drive means comprises an engine having an output shaft, gear means coupled to the output shaft of said engine for adjusting the rotary speed of said output shaft and electromagnetic clutch means coupling said gear means to a corresponding one of said generators.

5. An uninterruptible power supply comprising
n asynchronous generators, each having an input terminal, a stator, a shaft and an output terminal connected to a common electrical load, wherein n is a whole integer equal to at least two and wherein a change in load demand results in a change in the slip fraction of each of said generators;
n magnetic sensors for sensing current;
contact means connected between said load and each of said generators;
n drive means, each driving a corresponding one of said generators, whereby when one of said generators is driven above synchronous speed by a slip fraction while its stator is electrically excited its shaft mechanical power is converted to electrical output power at its output terminal; and
control means coupled to said load, coupled to said magnetic sensors for sensing current, coupled to said contact means for disconnecting failed one or more of said generators from said load and connected to the input terminals of said generators for providing an excitation voltage to each of said generators and controlling the phase of the excitation voltage of each of said generators with respect to the load voltage, said excitation voltage controlling the slip fraction of each of said generators whereby load current from any of said generators is completely controlled, said control means including electronic control means having a first input terminal connected to said load, n inputs each coupled to the output terminal of a corresponding one of said generators and each having a corresponding one of said magnetic sensors connected thereto for sensing the output current of each of said generators and a first plurality of n output terminals, n VAR correctors/phase shifting means each having an output terminal connected to the input terminal of a corresponding one of said generators, a first input terminal connected to a corresponding one of said first plurality of output terminals of said electronic control means and a second input terminal and excitation inverter means providing an excitation voltage for each of said generators, said excitation inverter means being connected to the second input terminal of each of said VAR correctors/phase shifting means for controlling the relative phase of the excitation voltage of each of said generators, the output power of each of said generators having a voltage and frequency determined by parameters of said excitation inverter means.

6. An uninterruptible power supply as claimed in claim 5, wherein each of said drive means comprises an engine and an inversely drooped hydraulic drive coupling the engine to a corresponding one of said generators.

7. An uninterruptible power supply as claimed in claim 5, wherein each of said drive means comprises an engine having an output shaft, gear means coupled to the output shaft of said engine for adjusting the rotary speed of said output shaft and electromagnetic clutch means coupling said gear means to a corresponding one of said generators.

8. An uninterruptible power supply as claimed in claim 7, wherein said electronic control means further has a second plurality of n output terminals, each connected to the clutch means of a corresponding one of said generators for controlling the slip fraction of said corresponding one of said generators.

9. An uninterruptible power supply comprising
n asynchronous generators, each having an input terminal, a stator, a shaft and an output terminal connected to a common electrical load, wherein n is a whole integer equal to at least two;
n drive means, each driving a corresponding one of said generators, whereby when one of said generators is driven above synchronous speed by a slip fraction while its stator is electrically excited its shaft mechanical power is converted to electrical output power at its output terminal, each of said drive means comprising an engine having an output shaft, gear means coupled to the output shaft of said engine for adjusting the rotary speed of said output shaft and electromagnetic clutch means coupling said gear means to a corresponding one of said generators; and
control means coupled to said load, coupled to said magnetic sensors for sensing current and connected to the input terminals of said generators for providing an excitation voltage to each of said generators and controlling the phase of the excitation voltage of each said generators with respect to the load voltage, said excitation voltage controlling the slip fraction of each of said generators whereby load current from any of said generators is completely controlled, said control means including electronic control means having a first input terminal connected to said load, n inputs each coupled to the output terminal of a corresponding one of said generators for sensing the output current of each of said generators, a first plurality of n output terminals, n VAR correctors/phase shifting means each having an output terminal connected to the input terminal of a corresponding one of said generators, a first input terminal connected to a corresponding one of said first plurality of output terminals of said electronic control means, a second input terminal and excitation inverter means providing an excitation voltage for each of said generators, said excitation inverter means being connected to the second input terminal of each of said VAR correctors/phase shifting means for controlling the relative phase of the excitation voltage of each of said generators, the output power of each of said generators having a voltage and frequency determined by parameters of said excitation inverter means, and a second plurality of n output terminals, each connected to the clutch means of a corresponding one of said generators for controlling the slip fraction of said corresponding one of said generators.

10. An uninterruptible power supply as claimed in claim 9, wherein each of said drive means comprises an engine having an output shaft, gear means coupled to the output shaft of said engine for adjusting the rotary speed of said output shaft and electromagnetic clutch means coupling said gear means to a corresponding one of said generators.

* * * * *